United States Patent [19]

Krohn et al.

[11] Patent Number: 5,073,027
[45] Date of Patent: Dec. 17, 1991

[54] FIBER OPTIC DISPLACEMENT MEASURING APPARATUS

[75] Inventors: David A. Krohn, Hamden; Edmond I. Vinarub, Cheshire, both of Conn.

[73] Assignee: 3M Fiber Optic Products, Inc., St. Paul, Minn.

[21] Appl. No.: 356,676

[22] Filed: May 23, 1989

Related U.S. Application Data

[63] Continuation of Ser. No. 907,726, Sep. 15, 1986, abandoned.

[51] Int. Cl.⁵ .............................................. G02B 5/16
[52] U.S. Cl. ................................ 356/373; 250/227.28
[58] Field of Search .............. 356/373, 375; 250/227, 250/227.28; 350/373, 375

[56] References Cited

U.S. PATENT DOCUMENTS

| | | | |
|---|---|---|---|
| 3,904,873 | 9/1975 | De Maine et al. | 250/227 |
| 3,940,608 | 2/1976 | Kissinger et al. | 250/227 |
| 4,325,638 | 4/1982 | Takeda et al. | 356/375 |
| 4,692,611 | 9/1987 | Hoogenboom | 250/227.28 |
| 4,750,835 | 6/1988 | McMurtry | 356/375 |

OTHER PUBLICATIONS

Kissinger et al., "Improved Noncontact Fiber Optics/Lens Displacement Measuring System", Proceedings of the Technical Program Electro-Optical Systems Design Conference (1973), pp. 372-377.

Primary Examiner—Richard A. Rosenberger
Attorney, Agent, or Firm—Gary L. Griswold; Walter N. Kirn; Stephen W. Buckingham

[57] ABSTRACT

Apparatus for determining the displacement or position of an object comprises a light source and a light receiver for receiving light transmitted from said light source, and a fiber optic conduit of Y-shaped configuration having the end of one arm thereof positioned adjacent said light source and the end of the other arm positioned adjacent said light receiver, said conduit arms forming a common bundle of optically conducting fibers in the base of said Y, some of which are transmitting fibers for conducting light from said light source to a surface of the object and some of which are receiving fibers for conducting light reflected from the surface of said object to said light receiver so that the conduit is normally objective to conduct light from said light source and to conduct reflective light impinging on an end face of said common bundle to said light receiver.

5 Claims, 2 Drawing Sheets

FIBER OPTIC DISPLACEMENT MEASURING APPARATUS

This is a continuation of application Ser. No. 06/907.726, filed Sept. 15, 1986 now abandoned.

BACKGROUND OF THE INVENTION

This invention relates to displacement measuring apparatus and, more particularly, to a new and improved fiber optic displacement measuring apparatus having greatly increased working distance and measuring range capabilities.

Fiber optic displacement measuring devices utilizing a bifurcated fiber optic bundle in combination with source and a photo detector or other suitable light receiver for measuring displacements are known. One such device is described in Kissinger U.S. Pat. No. 3,327,584, and comprises a fiber optic bundle divided at one end into separate arms. One arm contains transmitting fibers and the other arm contains receiving fibers. The other or common end comprises a common bundle of transmitting and receiving fibers. When placed with the face of the common end of the fiber optic bundle in close proximity to a reflective target, light from the transmitting fibers impinges on the target and is reflected back to the receiving fibers where it is conducted to a photosensor or other light receiver. The amount of reflected light is related to the distance between the end face of the fibers in the common bundle and the surface of the target, the diameter of the fibers, the numerical aperture of the fibers, the geometrical distribution of the transmit and received fibers, the total number of fibers, and the reflectivity of the target surface. Thus, as the gap between the bundle and the target increases, starting from a position of direct contact of the end face of the bundle with the surface of the target, greater amounts of light impinge on the receiving fibers in a substantially linear relationship to the displacement of the target. The amount of reflected light peaks and then decreases, however, once the bundle end face and target are separated by a distance on the order of 5 thousandths of an inch (5 mils).

Improvements over devices of the type just described are also known in the prior art. The apparatus described in Kissinger et al U.S. Pat. No. 3,940,608 includes a sensing head having a pair of projection lens mounted so that the end face of the common bundle is adjacent one end of the lens, the other end of the lens adapted to be positioned adjacent the object whose displacement is to be determined. The lens is operative, at a predetermined distance from the target, to focus the image of the end face of the common bundle onto the object and to refocus this image back on to the end face so that light transmitted from the fibers associated with the light source is returned upon itself. At this precise distance, known as the image focal point, the relative intensity of light detected by the sensor is at a sharp minimum, since the light is being reflected back onto transmitting as opposed to receiving fibers. Displacement of the object either closer or more distant than the image focal point causes defocusing of the image reflected back onto the end face so that more of the transmitted light is reflected onto receiving fibers and transmitted to the light receiving means to provide an output indicative of the target displacement.

The benefit provided by the '608 patent resides in an increase in the working distance (the distance from the sensing head to the surface to be measured) by a factor of about 100, i.e., from thousandths of an inch to tenths of an inch. Moreover, the '608 patent recognizes that by adjusting the gap between the end of the fiber and the lens the working distance may be effectively changed. However, despite the change in working distance, for a given lens configuration, the sensitivity and dynamic range of the structure shown in the '608 patent remains essentially constant.

Moreover, the apparatus illustrated in the '608 patent is a highly sensitive measuring device which can restrict its utility in measuring displacement relative to a surface subject to contamination that may affect the reflective characteristics of the target surface. For example, if a panel is being measured with the highly sensitive device of the '608 patent, a relatively small piece of dirt may cause a false reading due to the relatively small focused spot of light striking the target surface.

The present invention is an improvement over the displacement measuring apparatus of the '608 patent in that it enables displacement determination at greatly increased working distances from a target and over substantially larger dynamic ranges.

In addition, the sensitivity of the displacement measuring apparatus of the invention can be adjusted thereby limiting the likelihood of false readings due to contamination of a target surface in those situations where such contamination is a possibility.

SUMMARY OF THE INVENTION

The invention relates to apparatus for determining the displacement of an object which includes a fiber optic conduit of the type shown and described generally in Kissinger et al. U.S. Pat. No. 3,940,608. The sensing head of Kssinger et al. is replaced by an improved sensing head according to the invention.

The sensing head in the '608 patent employs back-to-back projection lenses which constitute a lens that is relatively insensitive to the position of the fiber relative to the lens and provides a focused light spot of essentially the same size for all probe positions (for a given lens). In accordance with the invention, the back-to-back lenses of Kissinger et al. are replaced by a single focusing lens which is capable of focusing the end of the fiber conduit at infinity, and means are provided to mount the fiber with respect to the lens so that the position of the fiber relative to the lens can be varied. Using a single focusing lens rather than the back-to-back lenses of the '608 patent also enables the user to tailor the general shape of the response curve to a particular application merely by adjusting the distance between the end of the fiber and the lens.

BRIEF DESCRIPTION OF THE FIGURES

The brief summary above, as well as other objects and advantages of the invention, are best understood by reference to the following detailed description taken with the accompanying figures in which.

DETAILED DESCRIPTION OF THE PREFERRED EMBODIMENTS

Figure 1:
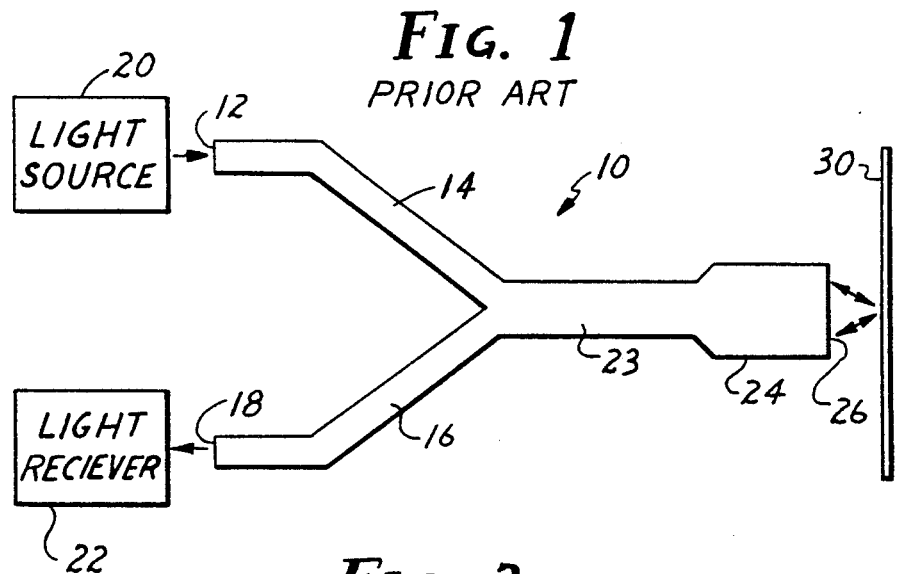
FIG. 1 is a schematic representation of a fiber optic displacement measuring device of the type to which the invention relates.

FIG. 1 illustrates the measuring apparatus with which the is intended to be used. The apparatus is illustrated in Kissinger '608 and includes a glass fiber optic conduit 10 of generally Y configuration. The end face 12 of one arm 14 of fiber optic conduit 10 is positioned adjacent a suitable light source 20 and the end face 18 of the other arm 16 is positioned adjacent a photo sensor or other suitable light receiver 22 for receiving light transmitted from light source 20. Conduit arms 14 and 16 form a common bundle 23 of optically conducting fibers in the base of the Y which is mounted to an end of a sensing head 24, the other or working end 26 of which is adapted to be positioned adjacent the surface of an object 30 whose displacement or position is to be determined.

Figure 2:
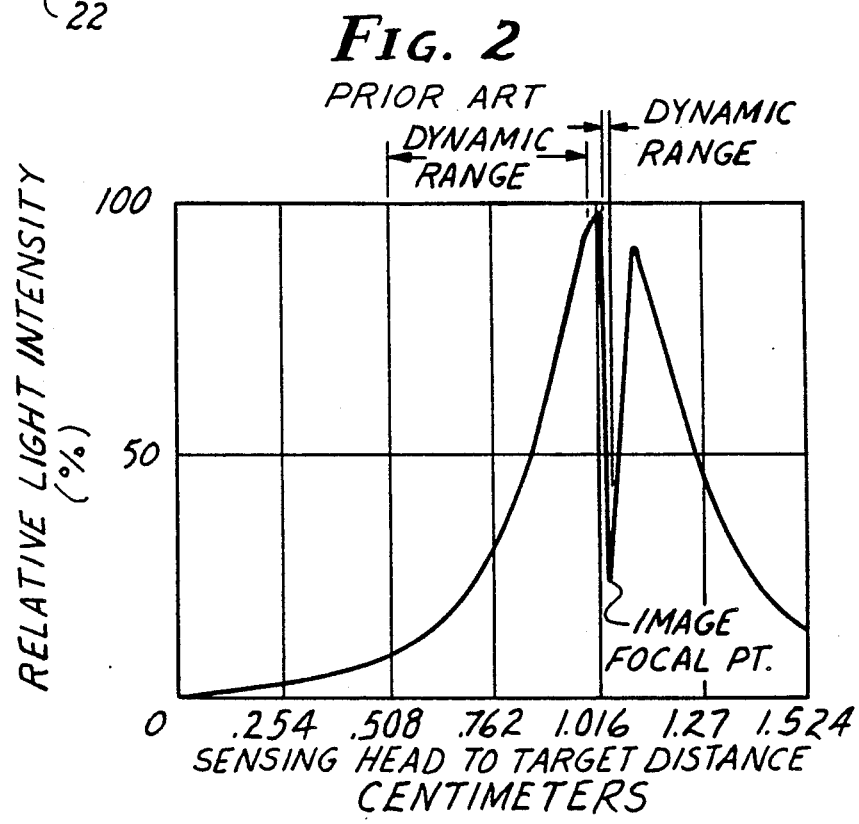
FIG. 2 is a graphical representation of the response curve of a prior art device.

The relative light intensity response curve of the Kissinger '608 system is shown in FIG. 2. The dynamic measuring ranges are indicated on the drawing. As can be seen, the curve exhibits a maximum on each side of the image focal point, this focal point corresponding to the lens focal length. The dynamic range on the forward slope of the curve extends from about 0.2 to 0.4 inches and, because of the sharply focused image, the dynamic range around the null point is very small. "Dynamic range" as used herein refers to the maximum usable distance that can be used for measurement between maximum and minimum points on the displacement curve. Thus, while it is possible to measure different distances by adjusting the lens position (see FIG. 7 of Kissinger '608), the dynamic range remains relatively constant. Hence, variation of lens position is required for changes in target distances in the order of tenths of an inch. Likewise, as shown by the steepness of the curves, sensitivity remains relatively constant for a given lens configuration which, as noted above, can restrict of the measuring apparatus.

The present invention uses a single lens rather than the pair of microscope lenses as shown in Kissinger '608. The lens has the capability of being focused at infinity and should have low aberration and a wide aperture. As used herein, "focusing" refers to positioning of the focused image of the forward face of conduct 23. For example, if the image focal point appears at about 0.4 inches (see FIG. 2), this means that a sharply focused image of the forward face of conduit 23 appears at that distance from the forward face of the sensing head.

Any of a variety of commercially available lenses may be used in accordance with the invention. In the preferred embodiment, a microscope lens with a numerical aperture of 0.25 and focal length of 16 mm was used. The difference with respect to the Kissinger lens is that, in accordance with the invention, changes in the position of the fiber relative to the lens results in large changes in the focal length and the size of the focused spot of light at the image focal point whereas comparable changes in the fiber position relative to the back to-back lens arrangement of Kissinger will result in little or no changes in focal length and the size of the focused spot of light at the image focal point.

Figure 3:
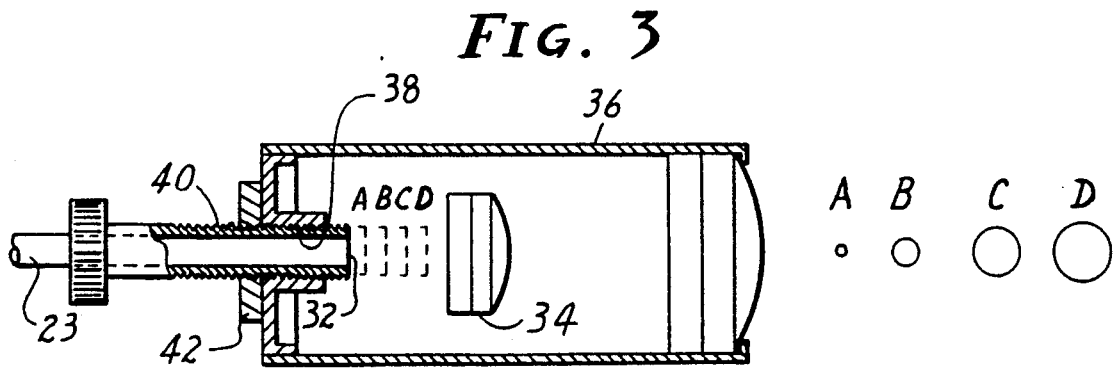
FIG. 3 is a diagrammatic illustration of a sensing head in with the invention.

FIG. 3 shows diagrammatically the structure of a sensing head in accordance with the invention. The fiber optic conduit 23 (FIG. 1) terminates in a forward face 32. The lens shown diagrammatically at 34 is held within a conventional housing 36 which includes a threaded bore 38. By way of example, lens 34 may be one of the projection lenses shown in Kissinger. The fiber 23 is retained within a complementary threaded sleeve 40 which can be screwed into the bore 38 and retained by a locking nut 42. With this structure, the position of the terminating face 32 of fiber conduit 23 relative to lens 34 can be finely adjusted. Typically, movement of the fiber 23 over a range of 0.25 inches will enable the image focal point to vary from 0 to infinity.

FIG. 3 also shows the effect of adjusting the position of the fiber optic relative to the lens. Four separate positions A through D are shown with position A being the furthest and position D the closest position of the fiber relative to the lens. As the fiber to lens distance is adjusted between positions A through D, the position of the image focal point changes as shown on the right-hand side of the drawing, with the size of the focused image (or light spot) changing accordingly. The change in size of the focused spot indicates a substantial change in sensitivity between positions A and D. As mentioned above, the ability to vary sensitivity can be an important consideration for a fiber optic measuring device in industrial applications.

Figure 4:
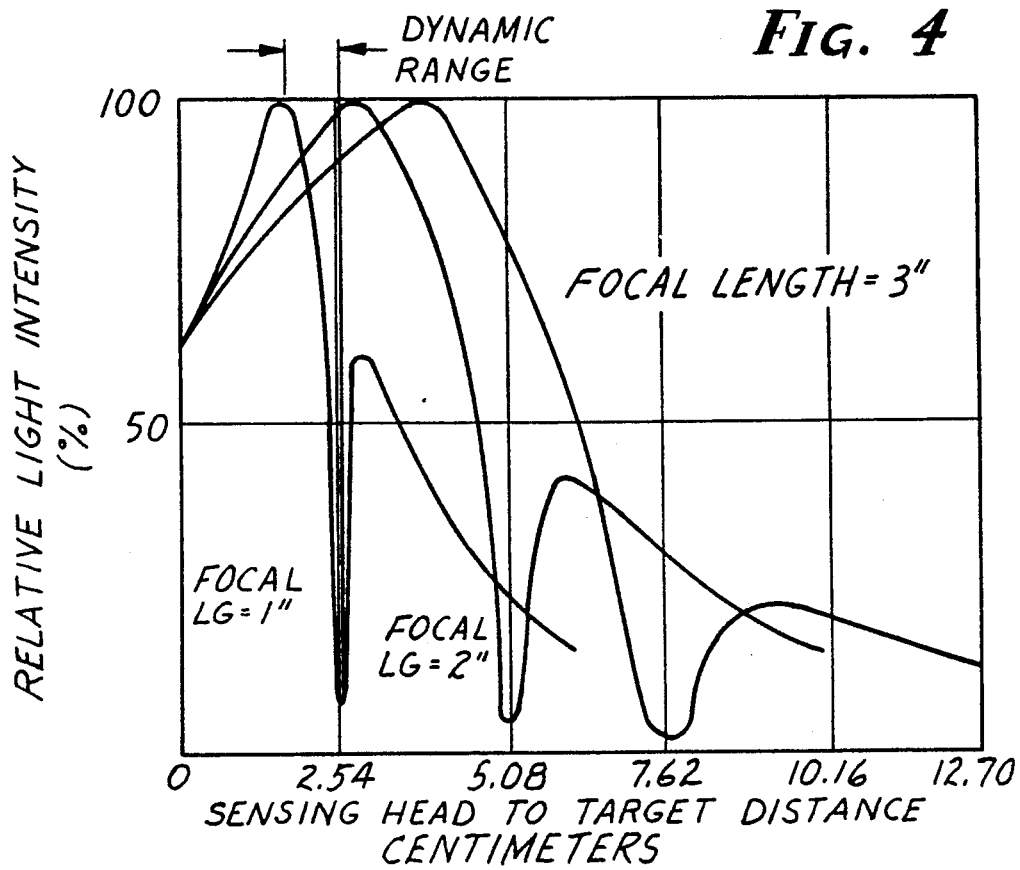
FIG. 4 is a graphical representation showing three response curves provided by the sensing head of FIG. 3.

The invention also provides the ability to measure much larger distances than is possible in the Kissinger device and also to vary the dynamic range, i.e., to increase the range at which the device can be used at a single position of the fiber relative to the lens. This is reflected in FIG. 4 which shows three actual curves of light intensity relative to target distance obtained by the invention. In comparison with comparable curves of FIG. 7 in Kissinger, the distance between the nulls is measured in inches as opposed to tenths of an inch. Moreover, with the invention, as the focal length is changed, the dynamic range increases and sensitivity (as reflected by the sharpness of the null) decreases. This ability to tailor the response curve substantially enhances the utility of the invention in that the slope of the curve can be adjusted in accordance with the tolerances of the part to be measured, existing environmental conditions and the available light.

Figure 5:
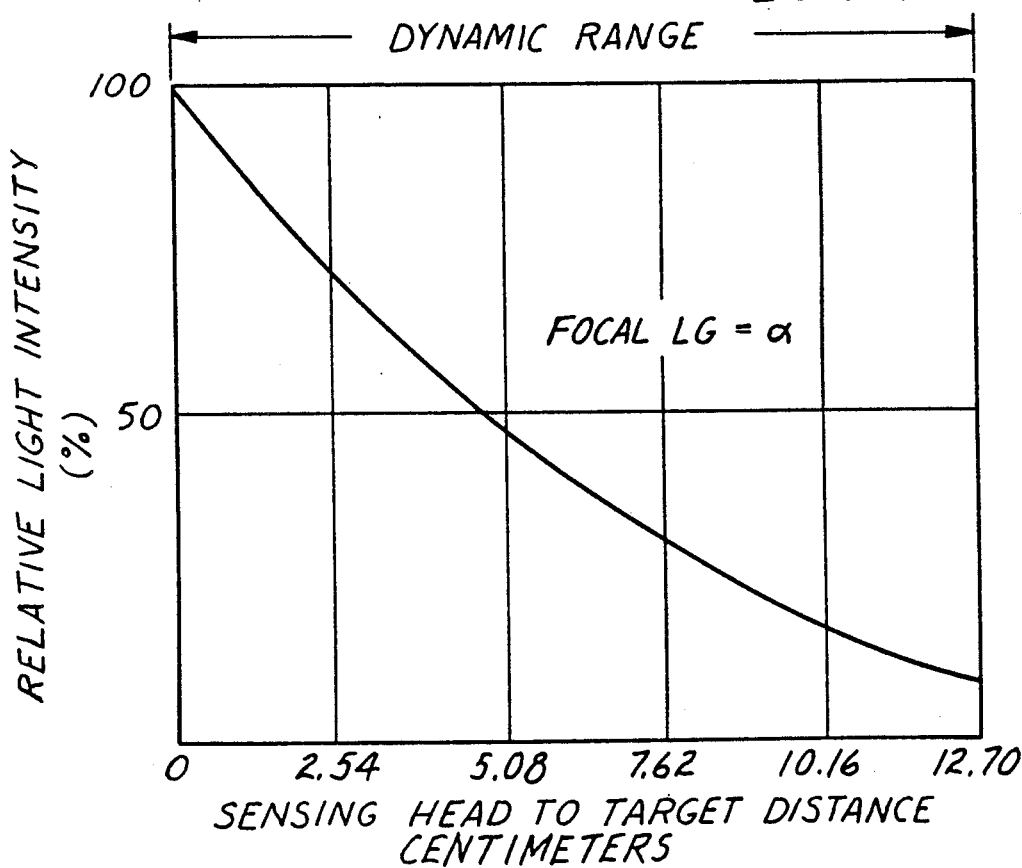
FIG. 5 is a graphical representation of the response curve provided by the invention with the lens focused at infinity.

A further important benefit of the invention lies in its capacity to focus at infinity. As explained below, not only does this greatly extend the dynamic range of the device but, in addition, it avoids redundancies inherent in any device where there is a maximum in the response curve at each side of the image focal point. For example, as shown in FIG. 2, if distances between 0.3 and 0.5 inches were being measured, a reflective light intensity of 50% would be detected four times corresponding to four different positions of the sensing head with respect to the target. Multiple sensors or complex signal processing apparatus are required in such cases to determine which of the four possible positions was actually located. If, however, in accordance with the invention the lens is focused at infinity, the responsive curve shown in FIG. 5 results wherein there is no minimum and, consequently, no redundancies in response. With the lens according to the invention focused at infinity, as shown in FIG. 5, the dynamic range is extended to about five inches.

In tailoring the response curve, there is a tradeoff between sensitivity and dynamic range—the greater the dynamic range the less the sensitivity; however, in many situations one or the other of these considerations is of greater importance. In using the invention, measurements may depend on the location of the null (e.g., to determine whether a part falls within prescribed tolerances) or the shape of the response curve (e.g., for analog-type measurements).

What is claimed is:

1. For use with optical apparatus for determining the displacement or position of an object which comprises a light source and a light receiver for receiving light transmitted from said light source and a fiber optic conduit of Y-shaped configuration having the end of one arm thereof positioned adjacent said light source and the end of the other arm positioned adjacent said light receiver, said conduit arms forming a common bundle of optically conducting fibers in the base of said Y, some of which fibers are transmitting fibers for conducting light from said light source to a surface of said object and some of which are receiving fibers for conducting light reflected from the surface of said object to said light receiver so that said conduit is normally operative to conduit light from said light source and to conduct reflective light impinging on an end face of said common bundle to said light receiver, the improvement comprising a sensing head having one end adapted to be positioned adjacent the surface whose displacement or position is to be measured, said sensing head including lens means and means for adjusting the position of said lens means relative to said end face, said means for adjusting the position of said lens means being capable of positioning said lens means so as to focus the image of said end face at infinity.

2. The improvement according to claim 1, wherein the position of said lens means relative to said end face is such that the image of said end face is positioned at infinity.

3. For use with optical apparatus for determining the displacement or position of an object which comprises a light source and a light receiver for receiving light transmitted from said light source; and a fiber optic conduit of Y-shaped configuration having the end of one arm thereof positioned adjacent said light source and the end of the other arm positioned adjacent said light receiver, said conduit arms forming a common bundle of optically conducting fibers in the base of said Y, some of which fibers are transmitting fibers for conducting light from said light source to a surface of said object and some of which are receiving fibers for conducting light reflected from the surface of said object to said light receiver so that said conduit is normally operative to conduit light from said light source and to conduct reflective light impinging on an end face of said common bundle to said light receiver, the improvement comprising a sensing head having one end adapted to be positioned adjacent the surface whose displacement or position is to be measured, said sensing head including lens means, and means for increasing the working distance and dynamic range of the apparatus while simultaneously decreasing the sensitivity thereof and said sensing head includes means for positioning said lens means such that the image of said end face is focused at infinity.

4. The improvement according to claim 3, wherein said working distance is variable by at least two inches.

5. The improvement according to claim 4, wherein the distance between said end face and lens means is such that the dynamic range is at least about five inches.

* * * * *